Oct. 25, 1932.  H. A. PHILLIPS  1,884,202
REFRIGERATION APPARATUS
Filed Nov. 12, 1929  3 Sheets-Sheet 1
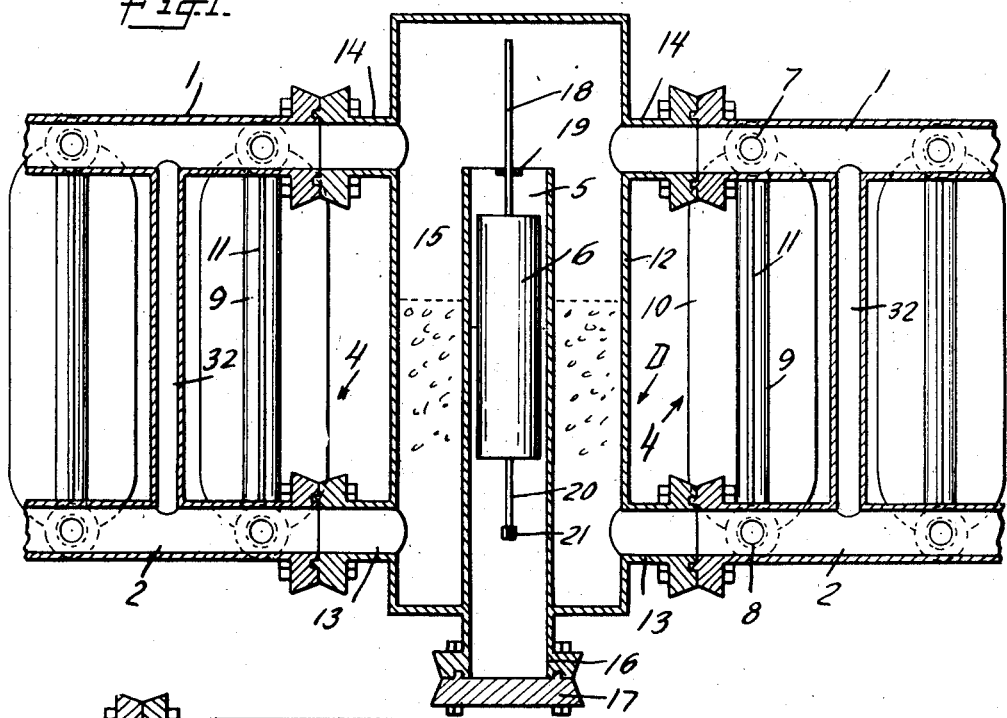
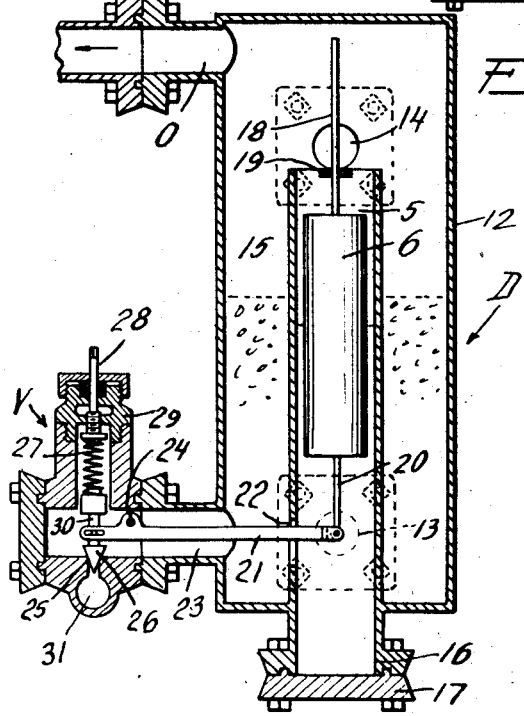
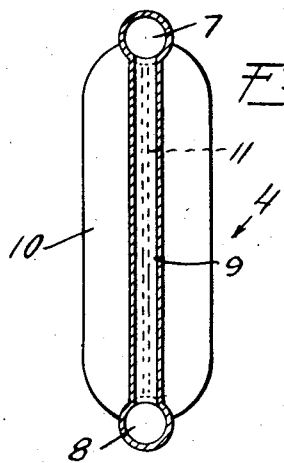
INVENTOR
Harry A. Phillips
BY
Pennie, Davis, Marvin & Edmonds
HIS ATTORNEYS

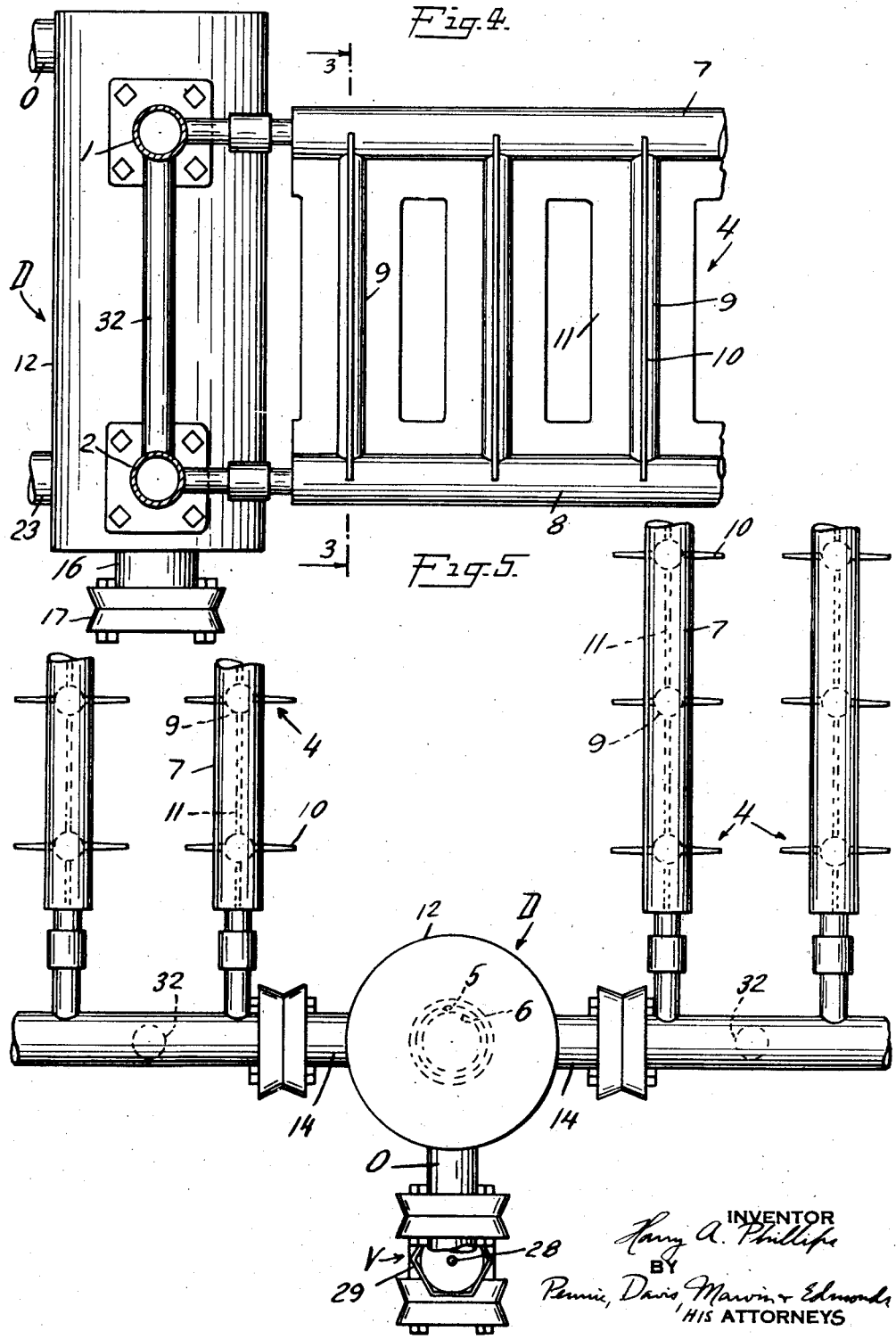

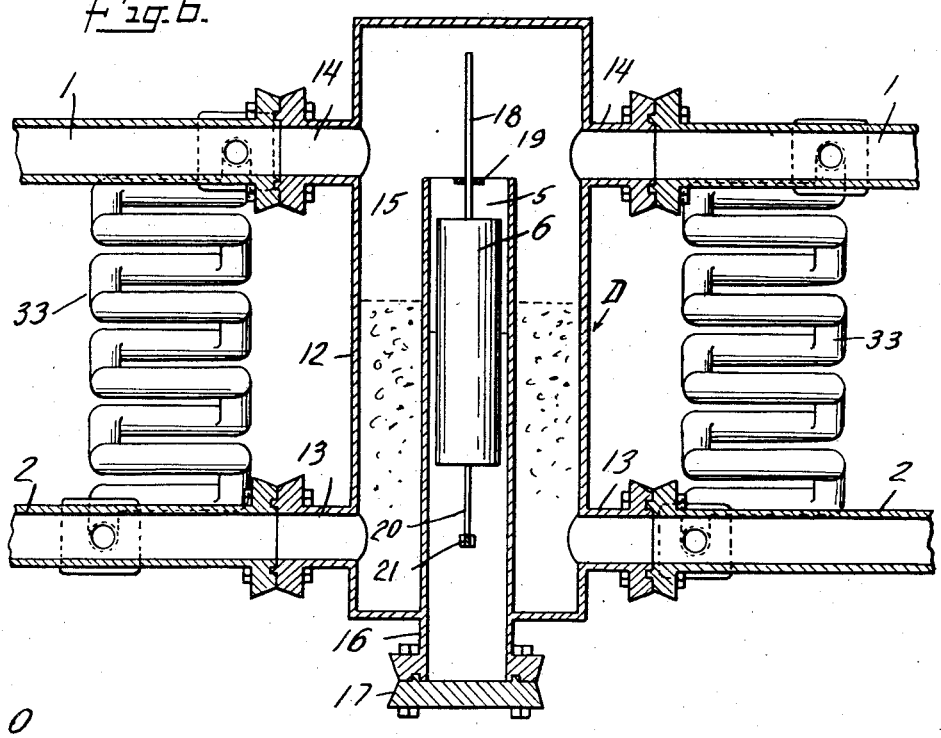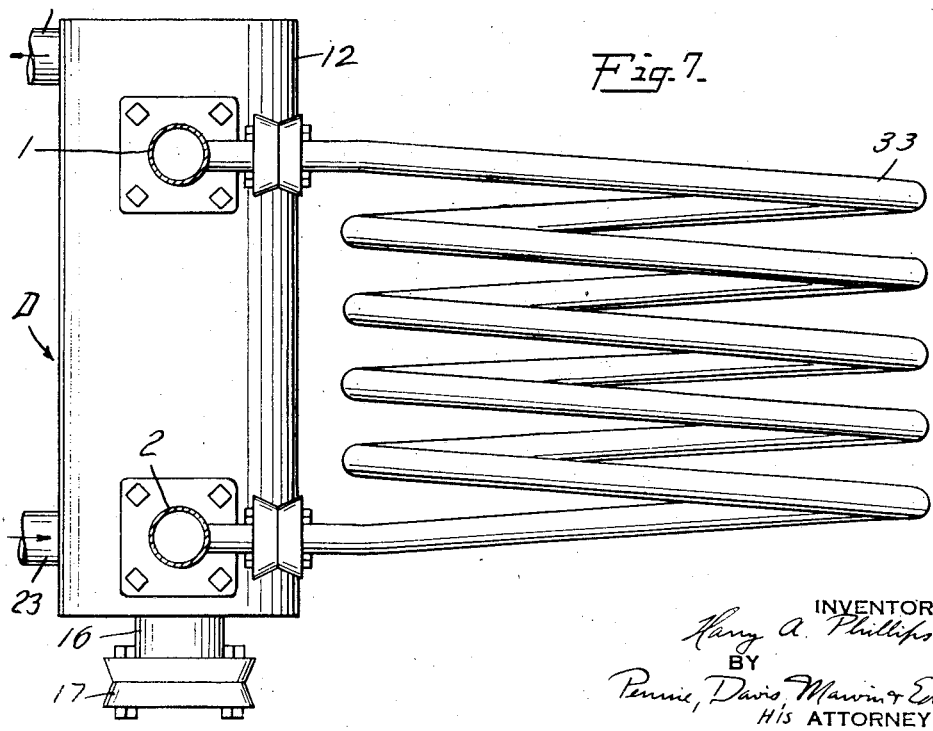

Patented Oct. 25, 1932

1,884,202

UNITED STATES PATENT OFFICE

HARRY A. PHILLIPS, OF EVANSTON, ILLINOIS

REFRIGERATION APPARATUS

Application filed November 12, 1929. Serial No. 406,563.

This invention relates to refrigeration apparatus and more particularly to refrigeration units especially adapted to utilize a refrigerating medium, such as ammonia or the like.

It is the object of this invention to provide an efficient refrigeration unit especially suitable for the refrigeration of meat coolers and for other industrial purposes. My invention utilizes the principles of the flooded refrigeration system. The use of the flooded system insures efficient heat transfer from all surfaces due to the fact that the major portion of all refrigerating surfaces are in direct contact with liquid refrigerant and all refrigerating surfaces are effective during the operating period. Furthermore, with such a system more heat is absorbed by the refrigerant during the non-operating period than is the case with refrigeration apparatus not employing the flooded system.

A further object of this invention is the provision of an improved refrigeration unit construction of such a nature that the apparatus may be manufactured in sectional form. In other words, it is an object of my invention to provide a construction which may be readily standardized in the form of sectional units which may be readily attached, one to another, for the purpose of building up a composite refrigeration system of any desired capacity.

In general, this invention comprises liquid and gas headers, expansion units communicating with these headers, a distribution chamber also communicating with the headers and a float chamber within the distribution chamber for controlling an inlet valve for the distribution chamber so as to maintain a predetermined liquid level in the apparatus. I prefer to locate the valve at a point remote from the float and in this way avoid erratic operation of the float due to the action of such refrigerant as may be converted into a gaseous state upon passing through the valve. In addition, I prefer to enclose the float in a chamber within the distribution chamber whereby gaseous refrigerant is prevented from entering the float chamber and the liquid refrigerant in the float chamber is effectively protected against heat absorption. The distribution chamber not only protects the float chamber against heat absorption, but acts as a by-pass connection for passing gaseous refrigerant from the inlet valve and the liquid headers around the expansion units and to the gas headers. Further by-pass connections may also be provided between the liquid and the gas headers. The successful and efficient operation of a refrigeration system depends in a large measure upon the degree to which disturbing conditions in the system may be eliminated, and I have found that by keeping gaseous refrigerant, which is formed in the liquid header or at the inlet valve, from coming into close proximity to the float and from entering the expansion units, and by protecting the float chamber against heat absorption, efficient and stable operation of the apparatus can be effected.

The valve mechanism for controlling the admission of refrigerant to the distribution chamber is preferably located at right angles to the headers in order to facilitate the connection of addition header sections to the unit whenever this may be desired, and I prefer to provide the valve with some conveniently located exposed adjusting device which makes it possible to adjust the valve without either shutting down the system or in any way interfering with its continued operation.

The various objects and advantages of my invention will be more apparent upon considering the following detailed description of certain embodiments thereof, as illustrated in the accompanying drawings. In the drawings;

Figure 1 is a vertical sectional view of an apparatus embodying my invention;

Fig. 2 is a sectional side view of the distribution chamber employed in the apparatus of Fig. 1;

Fig. 3 is a sectional view of one of the expansion units taken along the line 3—3 of Fig. 4;

Fig. 4 is an end view of the apparatus shown in Fig. 1;

Fig. 5 is a plan view of the apparatus shown in Fig. 1:

Fig. 6 is a vertical section of a modified form of apparatus embodying my invention; and Fig. 7 is an end view of the apparatus shown in Fig. 6.

The embodiment of my invention illustrated in Figs. 1 through 5, comprises generally a plurality of gas headers 1 and a plurality of liquid headers 2 communicating respectively with the upper and lower portions of a distribution chamber generally indicated at D, and a plurality of expansion units 4 communicating with the liquid and gas headers. The distribution chamber D includes a float chamber 5 in which a float 6 is mounted, and a control valve V, communicating with the distribution chamber D, is operated by the float 6. The gas and liquid headers 1 and 2 are preferably connected at suitable points by a vertical by-pass or equalizing pipes 32 which serve to conduct gaseous refrigerant from the liquid headers 2 directly to the gas headers, thus eliminating the necessity of having gaseous refrigerant, formed in the liquid headers, pass through the expansion units. It will be understood that the number of expansion units 4 connected between the gas and liquid headers 1 and 2 may be varied and that these units may extend from both sides of the headers, if desired.

Although the invention, in its broader aspects, is not in any way limited to the particular type of expansion units employed, I prefer in certain cases to use units of the general form illustrated in Figs. 1, 3, 4 and 5. As shown in Figs. 3, 4 and 5, these units comprise parallel horizontal gas and liquid pipes 7 and 8 connected at intervals by integral vertical passages 9 having laterally extending heat absorbing fins 10 thereon. Further, heat absorbing fins 11 are preferably provided in the spaces between adjacent vertical passages 9, as clearly shown in Fig. 4. This form of expansion or heat absorbing unit facilitates the passage of bubbles of gaseous refrigerant through the liquid refrigerant and renders the operation of the system more efficient because there is no tendency to form gas pockets in the units.

Referring now more particularly to the distribution chamber D, which forms an important feature of my invention, this chamber may take any suitable form, and as shown, comprises an outer container 12 of substantially circular section, provided with oppositely disposed flanged inlet and outlet passages 13 and 14 near its lower and upper ends respectively. The passages 13 and 14 are respectively detachably connected to the several liquid and gas headers 2 and 1 by suitable means. A vertical float chamber 5 of suitable section is formed integrally with or suitably secured within the outer container 12, the walls of the float chamber 5 and the outer container 12 being spaced apart to form a refrigerant chamber 15 which is in communication with the gas and liquid headers 1 and 2 as shown. The major portion of the float chamber 5 is entirely surrounded by the refrigerant chamber 15 but a small section of the float chamber extends below the bottom of the outer container 12 and terminates in a flanged port 16 having a removable closure 17 suitably secured thereto. The port 16 gives access to the interior of the float chamber 5 without necessitating the dismounting of the distribution chamber D. The float 6 may be of any suitable construction and is preferably mounted for free vertical movement within the chamber 5 on guide rod 18 which extends through a guide 19 at the top of the chamber 5. The float 6 is pivotally connected by a rod 20 extending from the lower end thereof to a valve actuating lever 21 which passes out through a side opening 22 near the lower end of the float chamber 5, as clearly shown in Fig. 2. An outlet port 0 is provided near the upper end of the outer container 12, and the gaseous refrigerant passes from the various sections of the refrigeration unit, through the chamber 15 and out of this port.

An inlet passage 23 communicates with the refrigerant chamber 15 of the distribution device D at a point near its lower end, and the control valve V is suitably connected in communication with this passage as shown in Fig. 2. The inlet passage 23 preferably extends laterally from the device D in a direction at right angles to the headers 1 and 2 as shown in Fig. 5. The valve actuating lever 21 extends through the inlet passage 23 and is pivotally mounted on a support 24 within the valve chamber. The valve mechanism, generally indicated at V, may be of any ordinary construction, but I prefer to provide this mechanism with some means of adjustment whereby the valve may be adjusted without shutting down the system, or in any way interfering with its continued operation. As illustrated in the accompanying drawings, the valve mechanism comprises a valve seat 25 and a valve member or plug 26 held against the seat 25 by a spring 27. The spring tension may be adjusted by means of a screw threaded rod 28 which is provided with a stem projected through the upper portion of the valve housing 29. This exposed stem may be adjusted as desired for the purpose of regulating the spring tension and in this way the operation of the valve may be altered to suit varying conditions. By regulating the valve, it is possible to change the level of the liquid in the apparatus. The lever 21, under the control of the float 6, actuates the valve stem 30 to regulate the size of the valve opening. Liquid refrigerant, such as liquid ammonia, may be introduced into the valve housing through the inlet 31, and from the valve housing, the refrigerant passes through the inlet passage 23 into the refrigerant chamber 15.

The above described construction and arrangement of the valve mechanism and the distribution chamber are such that any gaseous refrigerant formed at the valve or within the liquid headers 2 passes directly upward through the refrigerant chamber 15 and thus does not interfere with the stable operation of the float 6. Further, since the float chamber 5 is enclosed within the chamber 15, which is filled with liquid and gaseous refrigerant, the liquid refrigerant within the float chamber is effectively protected or insulated against heat absorption, and the possibility of gasification within the float chamber is thereby minimized. The refrigerant chamber 15 acts as a by-pass or equalization passage between the liquid headers 2 and the gas headers 1, and cooperates with the by-pass pipes 32 in conducting gaseous refrigerant from the liquid headers directly to the gas headers.

A modification of the invention wherein coils are employed as expansion units has been shown in Figs. 6 and 7. The coils 33 are preferably constructed in such a manner that the major portion of each coil extends at an angle to the horizontal, as best illustrated in Fig. 7. This form of coil facilitates the passage of bubbles of gaseous refrigerant through the liquid refrigerant in the coils and renders the operation of the system more efficient because there is no tendency for gas pockets to form in the coils. Where the coils consist of a series of oblong or rectangular loops, it is satisfactory to arrange to short bends in a substantially horizontal position, with the intermediate connecting portions or long sides of the loops, extending at an angle to the horizontal.

It will be apparent that the refrigeration unit of my invention is readily adaptable to variations in size and shape. Thus the headers 1 and 2 on one side of the distribution chamber D, together with the expansion units connected thereto, may be omitted, and the headers may be sectionalized and extended as desired in either direction from the distribution chamber. It will be understood that valve mechanism V and the float 6 for controlling the same will serve to regulate the supply of refrigerant to all parts of the unit regardless of the number or arrangement of the sections employed.

From the foregoing description, it will be understood that my invention may be utilized in the form of a compact refrigeration unit capable of enlargement and change in shape by the addition or removal of the various sections, the several parts being constructed and arranged in a manner to utilize a refrigerant, such as ammonia, to the best advantage. My invention is not limited to the details of construction illustrated or described, but includes such modifications thereof as fall within the scope of the appended claims.

I claim:

1. Means for controlling the admission of liquid refrigerant to a refrigeration unit comprising a float chamber, a float within said float chamber, a liquid refrigerant chamber surrounding said float chamber for protecting the liquid refrigerant in said float chamber against heat absorption and a valve controlled by said float for admitting liquid refrigerant to said refrigerant chamber at a point outside of and remote from said float chamber.

2. Means for controlling the admission of liquid refrigerant to a refrigeration unit comprising a liquid refrigerant chamber communicating with the refrigeration unit, a valve having a discharge orifice for admitting liquid refrigerant directly to said refrigerant chamber, a float chamber within said refrigerant chamber and communicating therewith, and a float in said float chamber for controlling said valve, the discharge orifice of said value being located outside of and at a point remote from said float chamber.

3. Means for controlling the admission of liquid refrigerant to a refrigeration unit comprising a refrigerant chamber communicating with a refrigeration unit, a valve for admitting liquid refrigerant to said refrigerant chamber, a float chamber within said refrigerant chamber and communicating therewith, a float in said float chamber for controlling said valve and a port in said float chamber communicating with the exterior of said refrigerant chamber for permitting access to said float.

4. A refrigeration unit comprising a liquid header, a gas header, at least one expansion unit communicating with said headers, a refrigerant chamber communicating with said headers and forming a by-pass around said expansion unit, a valve for admitting liquid refrigerant directly to said refrigerant chamber, a float within said refrigerant chamber for controlling said valve, and means in said refrigerant chamber between said valve and said float for protecting said float against bubbles of gaseous refrigerant formed at said valve.

5. A refrigeration unit comprising a liquid header, a gas header, at least one expansion unit communicating with said headers, a refrigerant chamber communicating with said headers and forming a by-pass around said expansion unit, at least one pipe communicating with said headers and forming an additional by-pass around said expansion unit, a valve for admitting liquid refrigerant to said refrigerant chamber, a float within said refrigerant chamber for controlling said valve and a partition within said refrigerant chamber surrounding said float and disposed between said float and said valve.

6. A refrigeration unit comprising a substantially horizontal liquid header, a substantially horizontal gas header, an expansion unit communicating with said headers, a substantially vertical refrigerant chamber communicating with said headers, a valve for admitting liquid refrigerant to said refrigerant chamber adjacent the lower end thereof, a float within said float chamber for controlling said valve, and means surrounding said float and disposed between said float and said valve for preventing the agitation thereof by gaseous refrigerant in said refrigerant chamber.

7. A refrigeration unit comprising a liquid header, a gas header, an expansion unit communicating with said headers, a refrigerant chamber communicating with said headers, a valve for admitting liquid refrigerant to said refrigerant chamber, a float chamber extending within said refrigerant chamber and communicating therewith, said float chamber having a portion thereof extending exteriorly of said refrigerant chamber, a float in said float chamber for controlling said valve and a port in the portion of said float chamber exterior to said refrigerant chamber for permitting access to said float.

8. A refrigeration unit comprising a distribution chamber including liquid level control means, a plurality of refrigerant headers communicating with said distribution chamber and extending from opposite sides thereof, a plurality of expansion units communicating with said headers, inlet means for admitting liquid refrigerant to said distribution chamber and outlet means for conducting gaseous refrigerant away from said distribution chamber, said inlet and outlet means being disposed at substantially right angles to said headers.

In testimony whereof I affix my signature.

HARRY A. PHILLIPS.